UNITED STATES PATENT OFFICE.

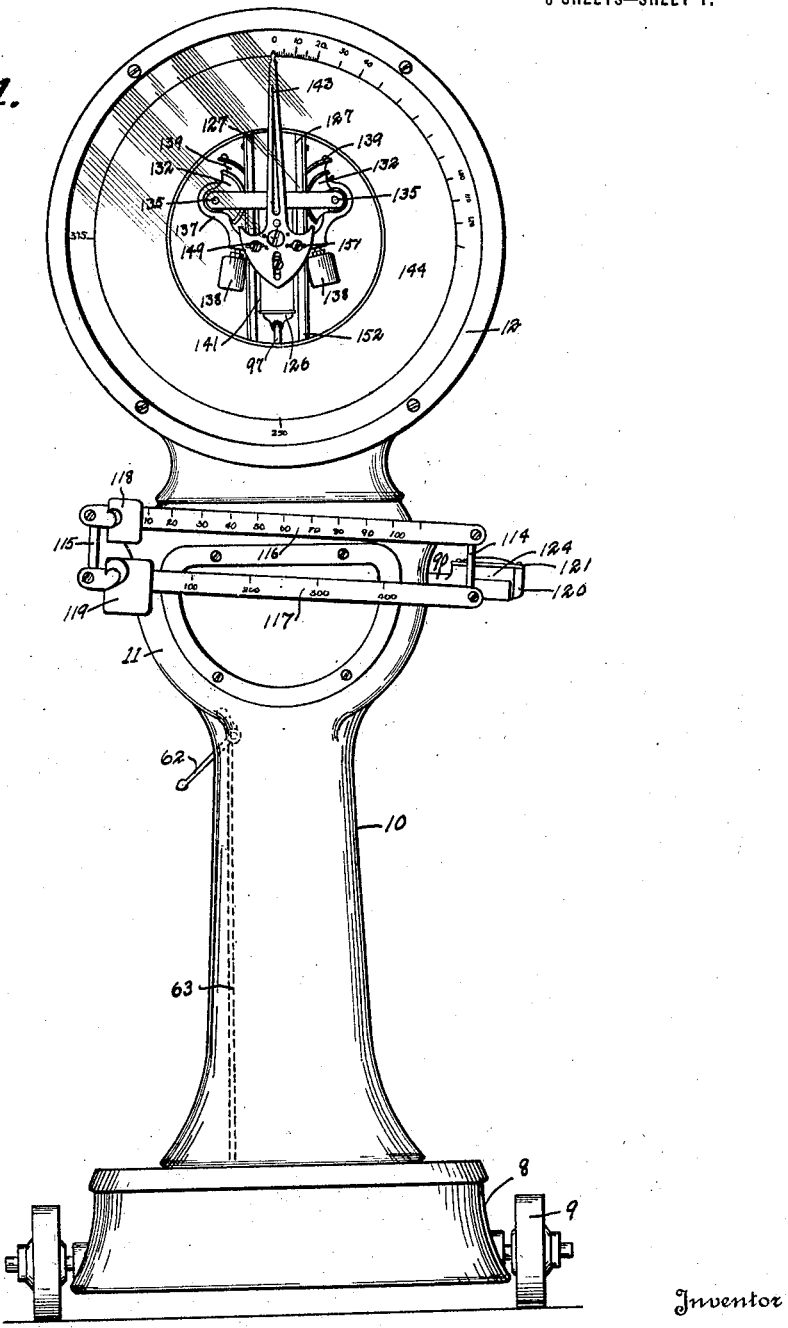

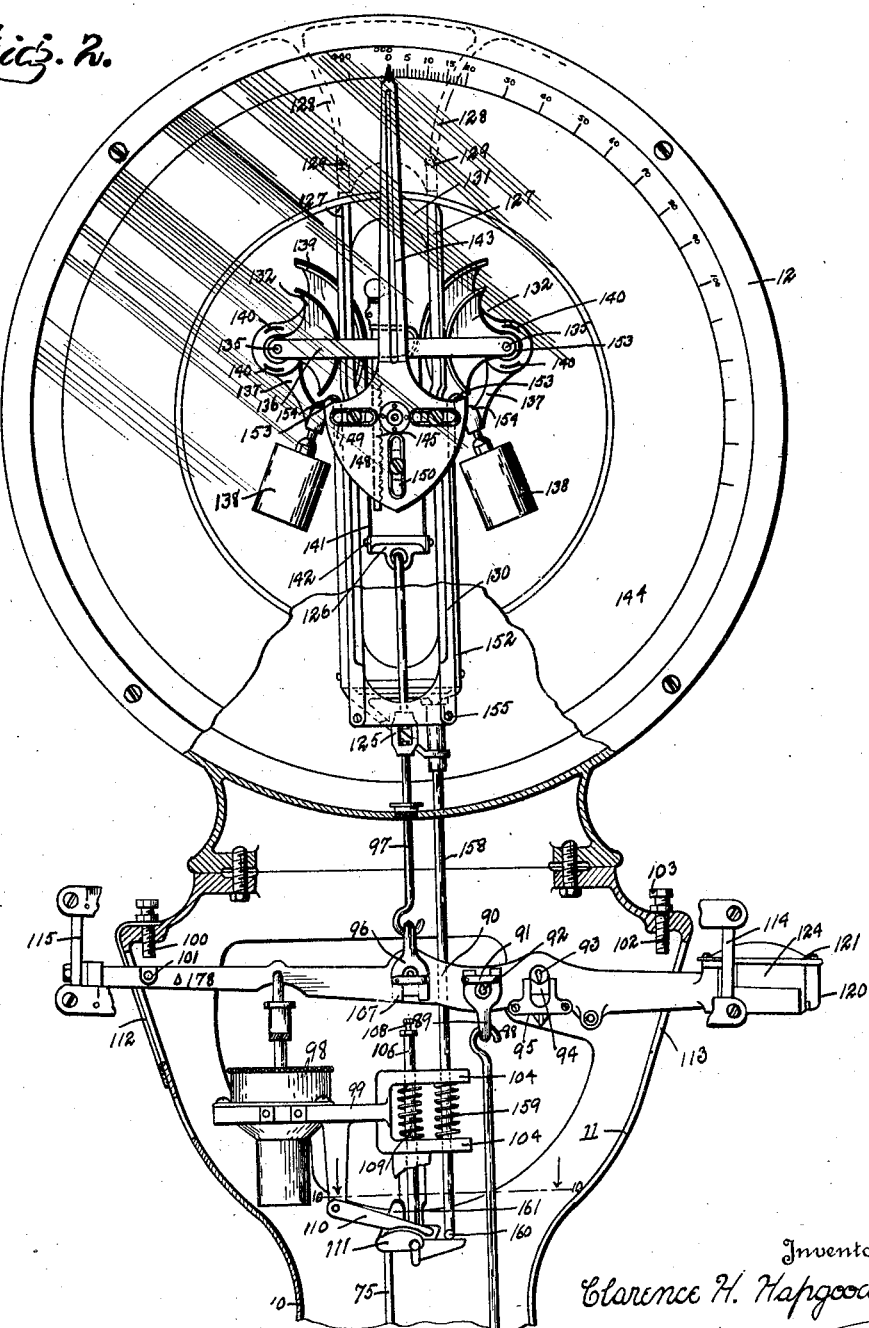

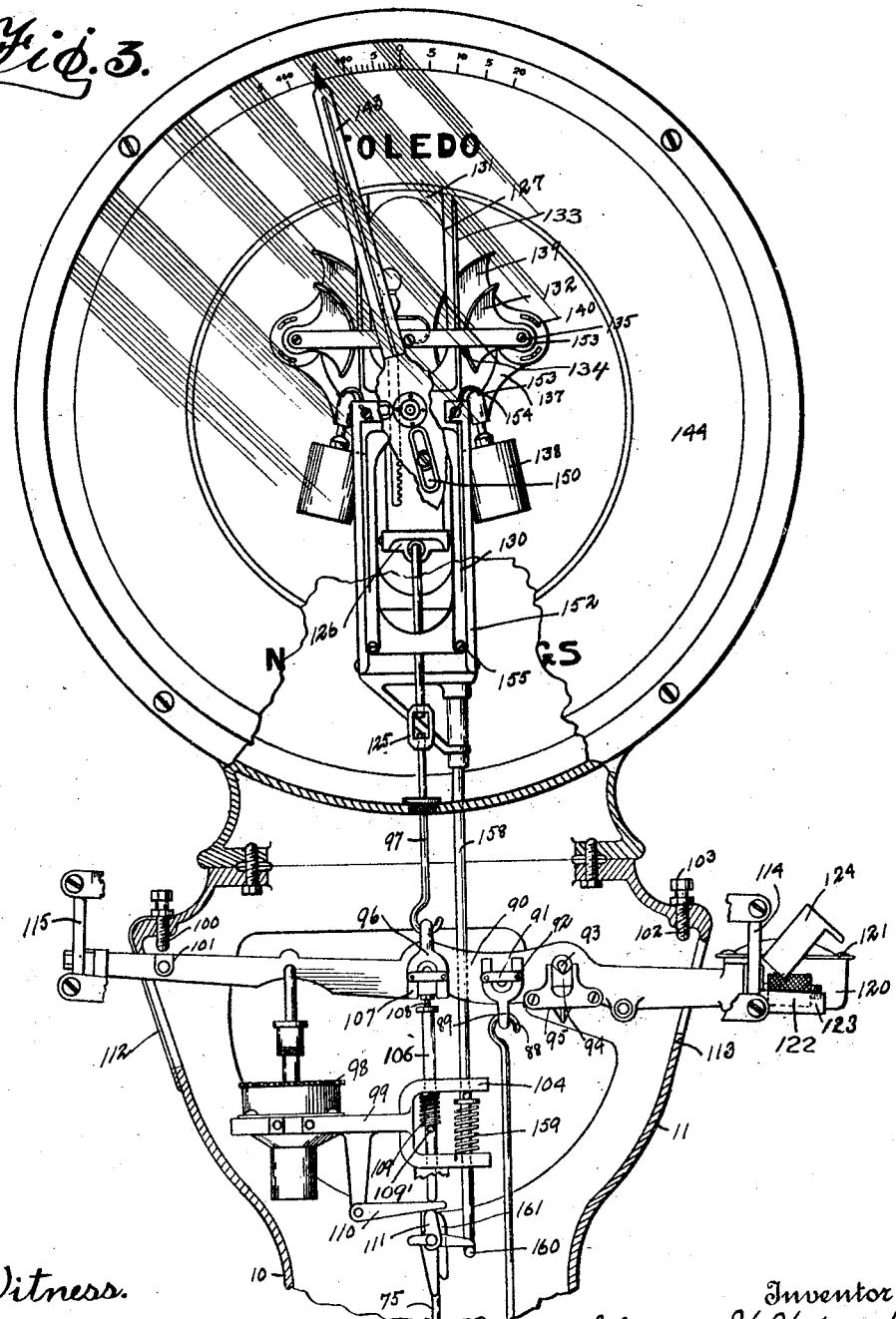

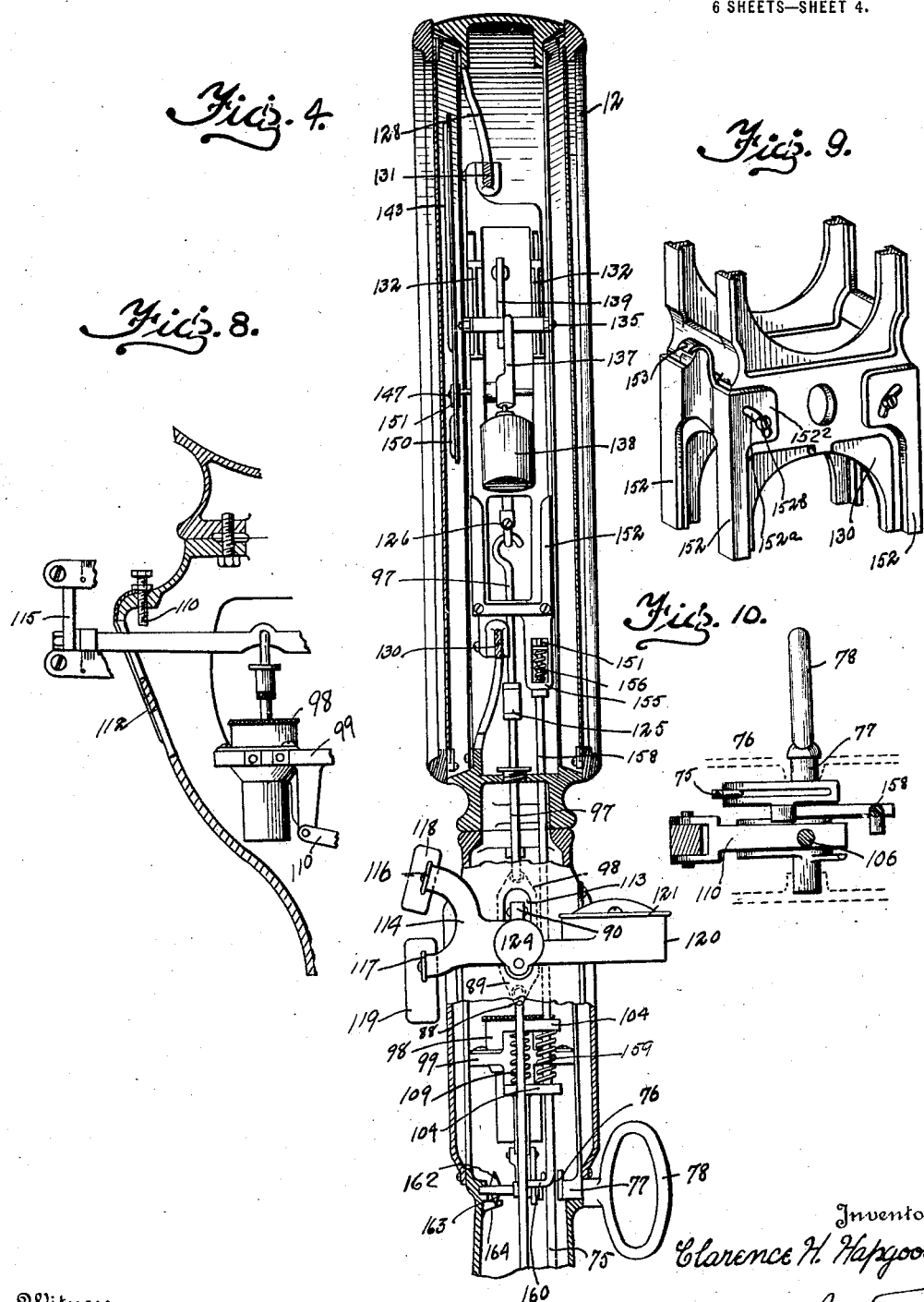

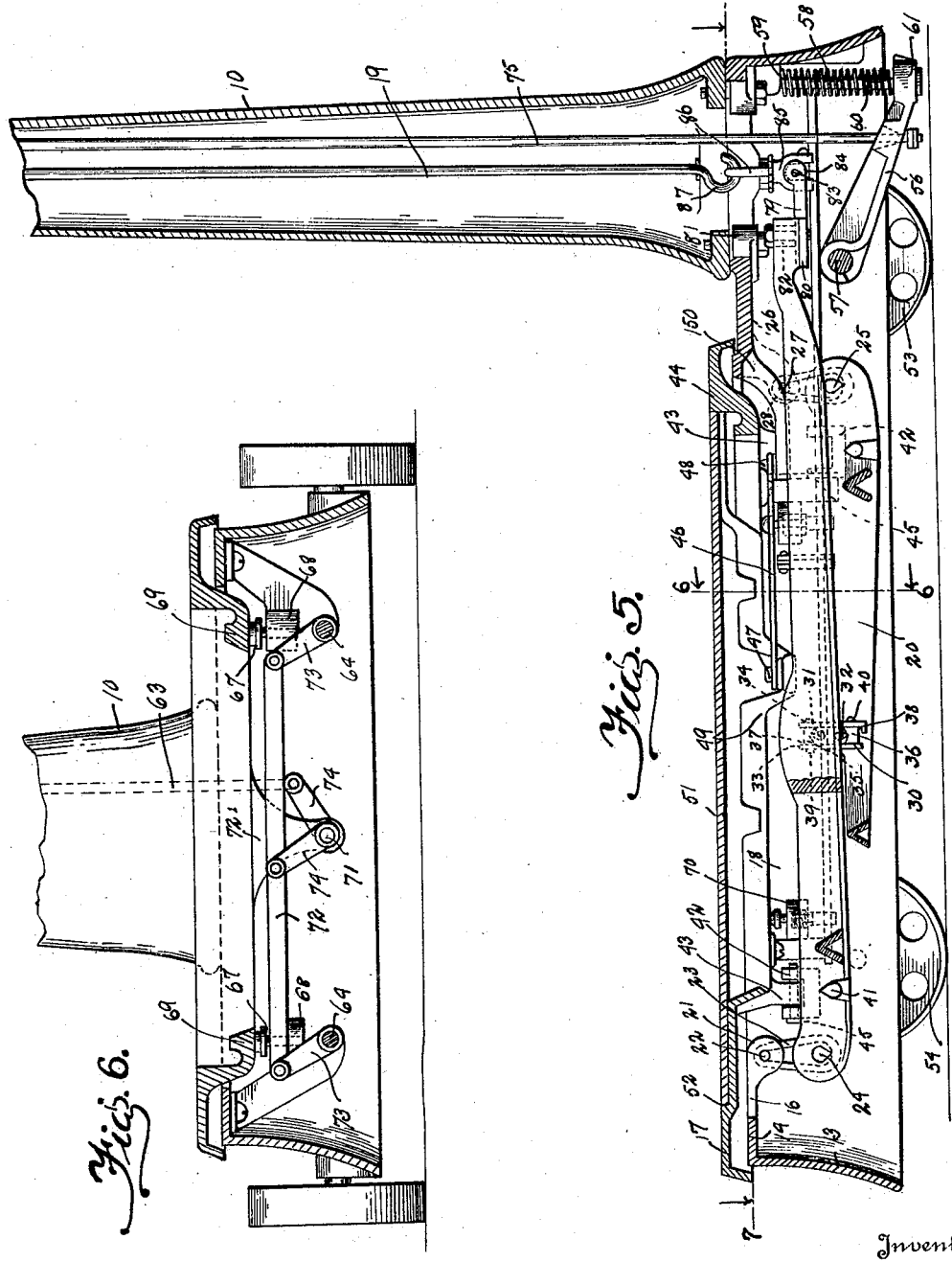

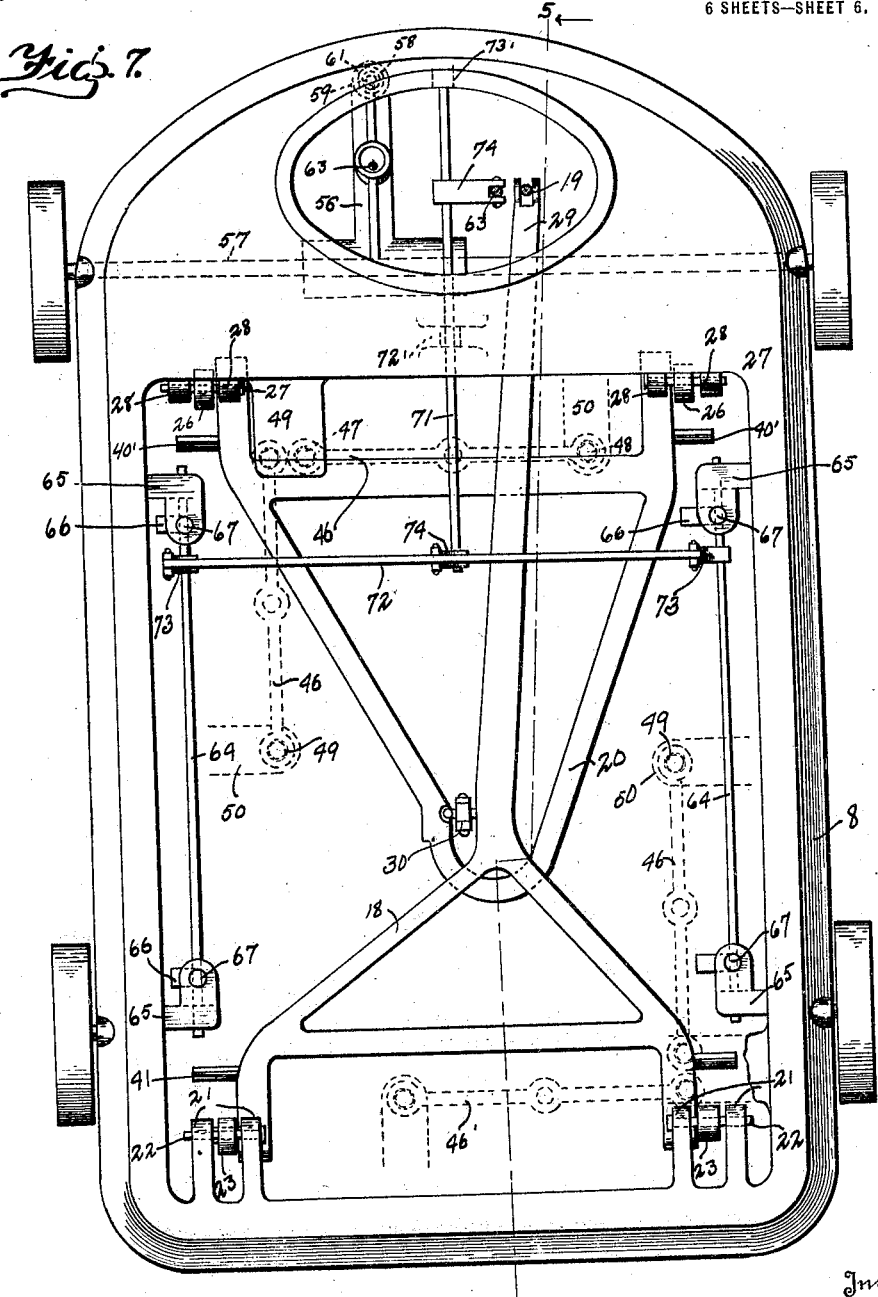

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

SCALE.

1,402,763.      Specification of Letters Patent.      Patented Jan. 10, 1922.

Original application filed February 17, 1913, Serial No. 748,874. Divided and this application filed September 30, 1918. Serial No. 256,176.

*To all whom it may concern:*

Be it known that I, CLARENCE H. HAPGOOD, a citizen of the United States, residing at Toledo, in the county of Lucas and State of Ohio, have invented certain new and useful Improvements in Scales, of which the following is a specification.

My invention relates more particularly to portable platform scales designed to rest and roll upon a floor and weigh comparatively heavy articles, though it will be understood that in many or all of its features the invention is applicable to other types of scales. It has in view more particularly the provision of means for preventing injury to the delicate parts of the scale during the shipment or use thereof, the prevention of accidental shifting of the machine as a whole when in use, and the adaptation of an improved automatic load-offsetting means to scales of this type.

Other objects and features of the invention will appear from the following description and claims. It is to be understood, however, that the disclosure of specific forms of my invention is for the purpose of exemplification only, although the preferred forms are illustrated and described, and that for a definition of the scope of the invention resort must be had to the claims, in which I have endeavored to differentiate the invention from the prior art without, however, relinquishing or abandoning any of my rights thereunder.

This application is filed as a division of my companion application filed February 17, 1913, Ser. No. 748,874, and is intended to cover all subject matter not claimed in such parent application.

In the drawings:—

Figure 1 shows a preferred embodiment of the invention in front elevation;

Figure 2 shows a similar view of the upper part of the scale partially broken away, partially in vertical section, and on an enlarged scale showing the interior mechanism;

Figure 3 is a similar view but with the parts in a different position, as will be presently described;

Figure 4 is a central vertical section of the same portion of the scale on a plane at right angles to that of Figures 1 and 2, with the interior mechanism shown in elevation;

Figure 5 is a longitudinal vertical section through the center of the base of the scale, with parts in elevation;

Figure 6 is a vertical section at right angles to the plane of Figure 5 upon the line 6—6 of Figure 5, parts being omitted for the sake of clearness;

Figure 7 is a horizontal plan partly in section on the line 7—7 of Figure 5;

Figure 8 is a vertical section showing a detail;

Figure 9 is a fragmentary perspective on an enlarged scale showing a detail of one of the means provided for preventing injury to the scale; and Figure 10 is a horizontal section on the line 10—10 of Figure 2 on a somewhat enlarged scale.

As usual in scales of this character, the base 8 of my machine is mounted upon four wheels 9 and supports at one end a hollow post or standard 10 carrying at its upper end a beam and weight-indicating and load-offsetting means. In the present scale the beam proper is mounted in a chamber 11 cast with the column 10, and the load-offsetting means is contained in a casing 12 mounted upon the chamber or housing 11.

The base 8 contains, as usual, a leverage system for supporting the load-receiving platform, preferably constructed substantially in accordance with my invention, as described and claimed in the parent application hereinbefore referred to. The base consists of a depending apron 13 and top 14 at the upper edge thereof, over an opening in which is bolted at 15 the hollow column before mentioned. The top is also open at 16 to permit the necessary connection between the leverage system and the load-supporting platform 17. The leverage system, as is common in scales of this character, comprises two levers of the second order, a main lever 18 pivoted at the front of the base but within its apron and connected to the scale beam by a link 19, and a second lever 20 pivoted or suspended at one end near the rear end of the base and connected to the main lever 18 at its forward end (see Figure 7). On these two levers the platform is supported as usual though the particular means of support is novel. Within the base and preferably formed integral with the top thereof are two pairs of lugs 21, 21, located respectively upon opposite sides of the base near the front end thereof and supporting pins 22, 22 which receive the upper ends of loops or stirrups 23, 23, the lower ends of which have seats or knives 24, 24 projecting laterally from the lever 18 and forming the pivots thereof.

The second lever 20 is similarly fulcrumed at the rear of the base, being provided for this purpose with knives 25, 25 supported in stirrups or loops 26, 26 depending from pins 27, 27 which extend through perforations in lugs 28, 28 projecting from the lower face of the top of the base. Both levers are cast as skeleton frames, although of somewhat different shape, as seen in Figure 7, the main lever being formed with an extended arm 29 which is connected to the scale beam, in a manner to be hereinafter described, and the second lever is supported at its forward end from the main lever by means of a shackle or link 30, which connects knives 31 and 32 formed upon the main and second levers respectively. The shackle 30 comprises a pair of side plates 33, 34 between which are mounted bearings 35, 36 for receiving respectively the knife edges upon the levers, and the ends 37, 38 of the side plates are bent over substantially at right angles to limit the play of the bearings which are pivoted upon pins 39, 40 extending through the side plates. Each of the levers is provided with a pair of outwardly extending knives $40^1$, 41 which support the scale platform upon which commodities to be weighed are placed. The location of these knives is best seen in Figure 7, and in Figure 5 is shown the construction by which the platform is supported thereon consisting of a set of U-shaped cradles 42, 42, one supported upon each knife edge, within which are pivoted legs 43, 43 depending from the under side of the platform frame 44. The cradles 42, as clearly appears in the drawing, are free to rock longitudinally of the base upon the knives upon which they rest, and the legs 43 are pivoted for lateral swinging movement upon the pins 45, 45 extending through the end members of the cradles and through the ends of the legs. By this construction the platform is free to move and adjust itself with relation to the levers in any direction, but it is held from excessive longitudinal and transverse movement by links 46, $46^1$, engaging studs 47, 48 projecting from ears 49, 50, formed upon the platform frame and base respectively (see full lines in Figure 5 and dotted lines in Figure 7). A filling plate 51 resting within a rabbet or recess 52 formed in the frame completes the platform.

As heretofore stated, the base is as usual mounted upon wheels, shown at 9, 9 in the drawings, to facilitate moving the same when desired, and in order to prevent accidental shifting of the scale, as, for example, when placing a heavy body upon it, I provide a braking or locking means which normally engages the floor upon which the scale rests. Referring more particularly to Figures 1 and 5 of the drawings, this device is seen to consist of an arm 56 pivoted upon a rod 57 at the rear end of the base, and normally pressed into contact with the floor at its outer end by a spring 58 mounted upon pins 59 and 60 upon the base and end of the arm respectively. The outer end of the arm is preferably provided with a rubber or other friction facing 61 to grip the floor under the pressure of the spring. Intermediate its pivoted and free ends the arm 56 is engaged by a link rod 75 which at its upper end is secured to a crank 76 upon a cross shaft 77, having a handle 78 for turning the same. It will be understood that when the scale is to be moved the brake is drawn up by turning the handle 78 but that at all other times the handle and shaft are in position to permit the brake to remain in contact with the floor and prevent motion relative thereto.

It will be noted that the braking or locking means is in contact with the floor when the remaining mechanism of the scale is free to operate and is lifted from the floor when the operating mechanism of the scale is locked. Common means are provided for releasing the braking means simultaneously with the locking of the operating mechanism, as hereinafter described.

In order to save the knife edges and other more delicate parts of the scale from injury and unnecessary wear, it is desirable that the weight of the platform be removed therefrom when heavy articles to be weighed are placed upon the scale. With this purpose in view, I have provided a mechanism under convenient hand control for normally supporting the platform. This construction is best shown in Figures 5, 6 and 7. It comprises a pair of longitudinal shafts 64, 64 revolubly mounted in brackets 65, 65 upon opposite sides of the scale base and carrying cams 66, 66 which are arranged to rotate beneath and raise the headed pins 67, 67 extending through lugs 68, 68 formed on the brackets, the heads of said pins being adapted to impinge against the flange 69 of the platform frame and raise the same when the cams are rotated in a proper direction for this purpose (see Figure 6). If gravity is found insufficient for the purpose, the pins may be provided with springs 70 surrounding the same within the lugs 68 and which are so connected with the pins as to force them down against the surfaces of the cams. The rock shafts 64 are connected together and to an intermediate rock shaft 71 by a link 72 engaging arms 73—74 on the side and center rock shafts respectively. Rock shaft 71 is suitably mounted in bearings $72^1$—$73^1$ and extends beneath the hollow column 10 where it is provided with an arm $74^1$ connected to a link 63. The latter extends upward within the column to a convenient height where it is connected to a handle 62 (see Figure 1). By turning the handle to the position shown in Figure 1 the shafts 71 and 74 are in position with the cams thereof supporting the pins and platform above and away from its operative bearings. When, however, it is desired to use the scale, the article to be weighed is placed upon the platform and the latter then lowered to its bearings as above described.

The main lever is provided at its rear end with an extension 79 adjustably connected thereto by dove-tailing at 80, a bolt 81 extending through a longitudinal slot 82 in the main lever end (see dotted lines in Figure 5) securing the parts together and permitting the adjustment referred to. The extension 79 is bifurcated at its outer end and provided with a knife 83 extending across the fork and supported upon a bearing 84 within a stirrup 85 hanging by a loop 86 from the hooked lower end of link 19. The last named element extends upward within the hollow column and is hooked at 88 within a yoke 89 which straddles and depends from the scale beam 90. At its opposite ends the yoke is bifurcated, the forks being spanned by ties 91 which form seats for the pivots 92 mounted upon and extending through the beam. The latter is supported by its knives 93 upon bearings 94 mounted in brackets 95 projecting from the front and rear walls respectively of the main casting, and is connected by a yoke 96 similar in all respects to the yoke 89 heretofore described, with a link 97 which in turn is suspended from the automatic load-offsetting means to be presently described. A dash pot 98 mounted upon a bracket 99, supported by the frame, serves to reduce the vibrations of the beam and bring it quickly to rest, and an adjustable screw stop 100 engaging a boss 101 upon the beam limits its movement in one direction, while a similar screw stop 102 upon the other side of the fulcrum limits the swinging of the beam in the other direction, both these stops being adjustably mounted on the frame of the main casting. The screw stops are formed with heads 103 for engagement by a wrench for turning them.

In order to prevent injury to the beam and its associated parts when not in operation or when a heavy article or commodity is placed upon the platform, I provide means for lifting the beam from its fulcrum. For this purpose the bracket 99 before mentioned is formed with a forked end 104, which forms a guide for a rod 106 adapted to abut against the under face of the beam at 107. As shown, the rod is formed in two sections, the upper and inner of which (seen at 108) is adjustable by means of a screw connection with the main section 106, and the latter is provided with a spring 109 bearing against the end face of the upper forked member $104^1$ and pin $109^1$ to normally force the rod downward out of range of the swing of the beam. An arm 110 is pivoted to an extension of the bracket 99 and is engaged by a cam 111 on the manually operated cross-shaft 77, heretofore referred to, which cam is so related to the crank connection on said shaft by which the brake arm is lifted from the floor that when the handle 78 is turned to a position to perform the latter function, it also causes the cam 111 through the arm 110 to raise the rod 106, which lifts the beam 90 from its bearings, and holds it against stops 100 and 102 (see Figure 3).

At its opposite ends the beam extends through openings 112, 113 in the housing and is provided with bifurcated brackets 114, 115 which extend forwardly of the casing and support between them tare and capacity increasing beams 116, 117, these beams being provided, as shown, with sliding poises 118, 119. At its right hand end the main beam is further provided with a shot box 120 with a removable cover 121, and a weight 122, adjustable upon a screw 123 for sealing the scale. A cover 124, shown raised in Figure 3, normally protects the said weight.

The link 97, before mentioned, is preferably formed in two sections connected by a turn buckle 125 to adjust the lengths thereof, and attached at its upper end to an equalizer bar 126 by which connection is made to the double load-offsetting mechanism. The last named device is formed of two similar pivoted members, a description of one of which will suffice for both.

A rectangular frame comprising four vertical pillars 127, 127 is suspended from the annular wall of the cylindrical casing 12 by brackets 128, 128 to which it is connected by screws or rivets 129, 129. The pillars are secured together at top and bottom by cross pieces 130—131 and form bearings or tracks for rocker segments 132—132 which have rolling contact thereon, being supported in position by flexible ribbons of steel or other suitable metal fastened to the lower ends of the segments as at and to the upper ends of the pillars, being thus interposed between the pillars and the segments at every position of the latter. The segments 132 are four in number, there being a pair upon each side of the rectangular frame, the members of each pair being secured to a common shaft 135—135, and the two shafts connected together by pivoted cross strips 136. The segment shafts and cross strips together form a frame which is movable vertically upon the pillars. To each shaft 135 is affixed a pendulum consisting of a bent arm 137—137 and a weight 138—138, the normal position of the pendulum being as shown in Figures 2 and 3 of the drawings. Intermediate the members of each pair of supporting segments 132 is a somewhat larger segment 139 which is also fixed to the shaft thereof with provision for adjustment indicated by the slots 140—140, said segment extending at its periphery between the pillars upon the same side of the rectangular frame and connected at its upper end to a metallic ribbon 141—141 which extends over the arcuate face of the segment and is attached at its lower end as at 142 to the equalizer bar 126. As above stated, the construction on both sides of the weight-offsetting means is the same, and the ribbons 141 being attached to opposite ends of the equalizer bar 126 which is pivoted to the link 97, if the scale be slightly tilted in the plane of the face of the dial and both pendulums thereby shifted in the same direction, it will have no effect upon the position of the link 97 since the amount of ribbon taken up upon one segment will be compensated by that given up by the other, the equalizer bar tilting slightly to adjust itself to the unequal lengths of the ribbons. An indicator hand 143 is pivoted concentric with the indicator dial 144 and the casing 12, and is revolved from the vertically movable frame by a rack 145 attached by a spring 146 to the latter and in mesh with a gear 147 shown in dotted lines on Figure 2 on the journal of the hand. The hand is formed of sheet metal and on opposite sides of and beyond its pivoted point is expanded into a plate 148 which is slotted at 149—150 to receive small adjustable weights 151—151 for accurately counterbalancing the hand.

In order to lock the pendulums from motion when the scale is being shipped or otherwise moved about over uneven floors and yards, I provide the mechanism best shown in Figures 2 and 9 comprising a frame 152 mounted to slide upon the vertical pillars 127 and the carrying hooks 153—153 which engage in notches or recesses 154—154 formed above the bends or elbows in the pendulums (see Figure 3). The hooks 153 are formed upon the upper ends of the resilient side members of the sliding frame and the latter are formed with lugs which embrace the stationary frame and are slotted as at 152ª to receive screws 152ᵇ which serve as guides for the upper end of the frame. The shape of the slots is such that when the frame is drawn downwardly to bring the hooks 153 into engagement with the pendulums, the movement of the side members is inward as well as downward, thus drawing the pendulums in as they are locked. At its lower end, the sliding frame carries a barrel 155 containing a spring 156 which extends between the bottom of said barrel and a button 157 upon the upper end of a connecting rod 158 which the spring surrounds, there being thus formed an elastic connection between the frame and the rod 158. The latter extends downwardly through perforations in the fork 104, above described, between the tines of which it is provided with a spring 159 which normally forces it upward. The connecting rod 158 extends below the fork and terminates in a perpendicular offset 160 which extends into the path of a cam 161 upon the cross-shaft 77 above referred to, which is so placed upon the shaft with respect to the cams which elevate the scale beam and raise the brake respectively that immediately after these functions are accomplished and especially after the beam has been raised, the cam 161 through the link 158 and frame 152 draws the hooks 154 into engagement with the notches in the pendulum arms and thereby locks the latter in their pendant position. The cross shaft 77 is limited in its oscillation by lugs 162—163 thereon engaging lug 164 formed upon the interior of the column 10. When the scale is not in use the handle 78 on the cross shaft 77 may be turned into locking position, and, by the mechanism heretofore described, the brake lifted from the floor, the beam lifted from its fulcrum and the pendulums which in the meantime, in case a weight has been placed upon the scale, and removed therefrom, have come to rest in the pendant position, are locked by the hooks upon the movable frame. The mode of operation of a platform scale of this character is well known, and need not here be described, and the operation of the double pendulum construction will be readily understood, the imposition of a weight upon the platform depressing that end of the beam to which the load-offsetting means is attached, which in turn draws upon the equalizer bar and not only swings the pendulums outwardly but lifts the vertically movable frame as a whole until the structure is again in equilibrium. The displacement of the pendulums is indicated by the hand 143 and may be read in terms of units of weight upon the dial.

While it will be apparent that the illustrated embodiments of my invention herein illustrated are well calculated to adequately fulfill the objects primarily stated, it is to be understood that the invention is susceptible to variation, modification and change without departing from the spirit and scope of the subjoined claims.

Having described my invention, I claim:

1. In a scale of the class described and in combination with the base thereof, an arm pivoted to the base and adapted to engage the supporting surface therefor, and yielding means for swinging said arm into and out of engagement with the supporting surface.

2. In a scale of the class described and in combination with the base thereof, a swinging arm having a braking surface adapted to engage the floor or support, a spring tending to swing the braking surface into engagement with the support, and a link and lever for raising the braking arm from contact with the support.

3. In a scale of the class described and in combination with the base thereof, a brake movably mounted on the base and adapted when set to hold the same against movement, load offsetting means, means for locking the load offsetting means against movement and means common to the brake and locking means for operating the same.

4. In a scale of the class described, a base, a brake movably mounted on the base and adapted when in operative position to prevent movement along the support on which the base rests, pendulum load offsetting means, means for locking the pendulum against movement and operating means common to the brake and locking means.

5. In a scale, a base therefor, a brake means for locking the base against movement along its support, a beam having load offsetting means thereon, means for locking the beam against movement and common operating means for said locking means and brake.

6. In a scale and in combination with the base thereof, a brake adapted when in operative position to hold the scale from movement along its support, a beam load offsetting means, pendulum load offsetting means, means for locking said beam and pendulum load offsetting means, and operating means common to said locking means and brake.

7. In a scale and in combination with the base thereof, a brake movably mounted on the base to lock the same against movement along its support, load offsetting means, locking means for said load offsetting means, and operating means for the locking means and brake arranged to release the brake and lock the locking means when moved in one direction and to render the brake operative and the locking means inoperative when moved in the other direction.

8. The combination with a portable base, of a dial scale mounted thereon, an operating mechanism for said scale, a locking foot adapted to engage the floor, a locking lever for said operating mechanism and means connecting said locking lever with said operating mechanism and locking foot.

9. The combination with a portable base, of a scale mounted thereon, operating mechanism for said scale, means for locking said operating mechanism, and means upon said scale dependent upon said locking means for bearing firmly against the floor when said operating mechanism is unlocked.

10. The combination of a portable base, a scale mounted thereon, load-offsetting means for the scale, means for holding the portable base against shifting movement on its support, vertically-movable means for locking and releasing the load-offsetting means, and common means for operating said locking means and holding means whereby one of said means is rendered operative when the other of said means is rendered inoperative.

11. The combination of a portable base, a scale mounted thereon, pendulum load-offsetting means for the scale, vertically-movable means for engaging and releasing the pendulum load-offsetting means, manually operated means for operating the latter, a brake for holding the portable base against shifting movement relative to its support, and connections between the manually-operated means and the brake whereby the brake is thrown into operative position when the pendulum load-offsetting means is released and into inoperative position when the load-offsetting means is engaged.

12. The combination of a portable base, a scale mounted thereon, load-offsetting means for the scale comprising a pair of pendulums, a unitary locking device for the two pendulums, means on the portable base for holding it against shifting upon its support, and common means for operating the pendulum locking device and said holding means.

13. The combination of a portable base, a scale mounted thereon, said scale including a pair of oppositely moving pendulums constituting a load-offsetting means, a vertically-movable unitary locking device for said pendulums, a brake for preventing shifting movement of the base, and manually operative means common to said locking device and brake for throwing them into operative and inoperative positions.

14. The combination of a portable base, and a scale mounted thereon, means for securing the base against shifting on its support, means for locking the movable elements of the scale, and means common to the scale and base securing means for locking the movable elements when the base securing means is released and for releasing the movable elements in the scale when the base securing means is locked.

15. The combination of a portable base, a scale mounted thereon, said scale comprising a pair of oppositely moving pendulums constituting a load-offsetting means, a unitary locking device for the pendulums bodily movable between the same, a brake on the portable base for preventing shifting thereof, and means common to the brake and pendulum locking means for throwing the brake into operative position when the locking device is released and vice versa.

16. In a scale of the class described and in combination with the platform, a system of levers supporting the same, a scale beam and connections to said levers, a brake for engaging the floor to prevent the scale from shifting and means for raising the same, means for raising the beam from its fulcrum, automatic load-offsetting means comprising a pendulum, means for locking the pendulum against movement, and manually-operated means common to the brake raising means, the beam raising means and the pendulum locking means for controlling the same.

17. In a scale of the class described having a platform, a leverage system upon which the platform rests, a beam to which the leverage system is connected, means for raising the beam and supporting it away from its bearings, a floor brake and means for raising the same, automatic load-offsetting and weight indicating means including a pendulum connected to the beam, as oscillatory cross shaft provided with a series of cams, and connections from the pendulum locking means, beam raising means and the brake raising means engaged by said cams for operating said means.

CLARENCE H. HAPGOOD.

Witnesses:
 GEORGE R. FRYE,
 C. E. WILCOX.